(12) United States Patent
Cappillino et al.

(10) Patent No.: US 11,267,830 B2
(45) Date of Patent: Mar. 8, 2022

(54) FLOW BATTERY AND COMPONENTS THEREOF

(71) Applicant: University of Massachusetts, Boston, MA (US)

(72) Inventors: Patrick J. Cappillino, Raynham, MA (US); Ertan Agar, Lowell, MA (US); Haobo Huang, Waltham, MA (US)

(73) Assignee: University of Massachusetts, Boston, MA (US)

( * ) Notice: Subject to any disclaimer, the term of this patent is extended or adjusted under 35 U.S.C. 154(b) by 234 days.

(21) Appl. No.: 16/491,804

(22) PCT Filed: Mar. 7, 2018

(86) PCT No.: PCT/US2018/021359
§ 371 (c)(1),
(2) Date: Sep. 6, 2019

(87) PCT Pub. No.: WO2018/165312
PCT Pub. Date: Sep. 13, 2018

(65) Prior Publication Data
US 2021/0139516 A1    May 13, 2021

Related U.S. Application Data

(60) Provisional application No. 62/468,250, filed on Mar. 7, 2017.

(51) Int. Cl.
*C07F 9/00* (2006.01)
*H01M 4/90* (2006.01)
*H01M 8/18* (2006.01)

(52) U.S. Cl.
CPC .......... *C07F 9/005* (2013.01); *H01M 4/9008* (2013.01); *H01M 8/18* (2013.01)

(58) Field of Classification Search
CPC ........ C07F 9/005; H01M 4/9008; H01M 8/18
See application file for complete search history.

(56) References Cited

U.S. PATENT DOCUMENTS

| | | | |
|---|---|---|---|
| 2010/0099912 A1* | 4/2010 | Pombeiro | C07C 51/15 562/856 |
| 2014/0060641 A1 | 3/2014 | Nazeeruddin et al. | |
| 2014/0066290 A1 | 3/2014 | Koshino et al. | |
| 2016/0308220 A1 | 10/2016 | Qi et al. | |

FOREIGN PATENT DOCUMENTS

WO    WO-2015139060 A1    9/2015
WO    WO-2018165312 A1    9/2018

OTHER PUBLICATIONS

New molybdenum(v) analogues of Amavadin and their redox properties J. Chem. Soc., Dalton Trans., 2001, 3108-3114 (Year: 2001).*

(Continued)

*Primary Examiner* — Stewart A Fraser
*Assistant Examiner* — Patrick Marshall Greene
(74) *Attorney, Agent, or Firm* — Schwegman Lundberg & Woessner, P.A.

(57) ABSTRACT

The present disclosure provides a complex having a metal and ligand anionic complex that is counterbalanced by a cation. The complex can be suited for many uses including in a battery.

28 Claims, 11 Drawing Sheets

(56) References Cited

OTHER PUBLICATIONS

Studies with Amavadin and related complexes (Year: 2014).*
"Australian Application Serial No. 2018231214, First Examination Report dated Apr. 9, 2021", 2 pgs.
"International Application Serial No. PCT/US2018/021359, International Search Report dated Apr. 25, 2018", 2 pgs.
"International Application Serial No. PCT/US2018/021359, Written Opinion dated Apr. 25, 2018", 3 pgs.

* cited by examiner

FLOW BATTERY AND COMPONENTS THEREOF

PRIORITY APPLICATION

This application is a U.S. National Stage Filing under 35 U.S.C. 371 from International Application No. PCT/US2018/021359, filed on Mar. 7, 2018, which claims priority to U.S. Provisional Application Ser. No. 62/468,250, filed Mar. 7, 2017, the disclosures of which are incorporated herein in their entireties by reference.

BACKGROUND

Redox flow batteries (RFBs) are a promising large-scale energy storage technology for integration of intermittent renewable sources, such as wind and solar, into the electrical grid. As fossil fuel consumption diminishes over the next several years, increasing reliance on these green energy sources can lead to expanding market potential.

SUMMARY OF THE DISCLOSURE

The present disclosure provides A complex having a structure according to Formula I:

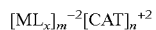 (I).

M is metal and L is a ligand that has a structure according to Formula II:

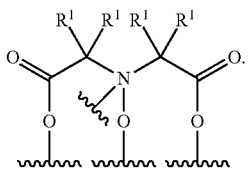 (II)

At each occurrence, $R^1$ is independently chosen from —H, substituted or unsubstituted $(C_1-C_{10})$hydrocarbyl, —F, —Cl, —Br, and —I. CAT is a cation. The values m and n are independently 1 to 10. The value x is 1 to 3

The present disclosure provides A complex having a structure according to Formula I:

$[ML_2]^{-2}[CAT]^{+2}$ (IA).

M is metal and L is a ligand that has a structure according to Formula II:

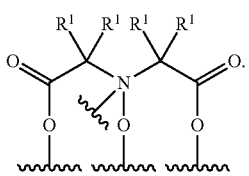 (II)

At each occurrence, $R^1$ is independently chosen from —H, substituted or unsubstituted $(C_1-C_{10})$hydrocarbyl, —F, —Cl, —Br, and —I. CAT is a cation.

The present disclosure further provides a battery. The battery includes at least one of an anode solution and a cation solution comprising a first quantity of a complex. The complex has a structure according to Formula I:

$[ML_2]^{-2}[CAT]^{+2}$ (IA).

M is metal and L is a ligand has a structure according to Formula II:

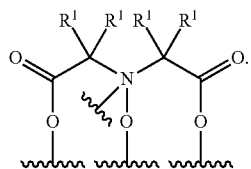 (II)

At each occurrence, $R^1$ is independently chosen from —H, substituted or unsubstituted $(C_1-C_{10})$hydrocarbyl, —F, —Cl, —Br, and —I. CAT is a cation. In the complex the metal is in a first oxidation state. The battery further includes a cathode solution comprising a second quantity of the complex. The second quantity of the complex has the metal in a second oxidation state different than the first oxidation state.

The preset disclosure further provides A method of making a complex having a structure according to Formula I:

$[ML_2]^{-2}[CAT]^{+2}$ (IA).

M is metal and L is a ligand has a structure according to Formula II:

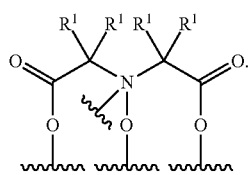 (II)

At each occurrence, $R^1$ is independently chosen from —H, substituted or unsubstituted $(C_1-C_{10})$hydrocarbyl, —F, —Cl, —Br, and —I. CAT is a cation. The method includes mixing the metal and a structure according to Formula (VII):

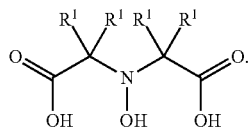 (VII)

There are several advantages to using the complex of the present disclosure, some of which are unexpected. According to some embodiments of the present disclosure, a reason to use the complex described herein in conjunction with a nonaqueous flow redox battery (NRFB) includes the complex's high stability. This attribute can directly affect the economic feasibility of such a battery by mitigating capacity fade that decreases battery lifetime and increases cost. According to some embodiments of the present disclosure, the high stability can also facilitate engineering improvements to attributes of the battery such as solubility of the complex and power density of the battery. Additionally, according to some embodiments of the present invention, the stability of the complex allows for large-scale synthesis of the complex. According to some embodiments of the present disclosure the —$R^1$ groups can be changed to alter the solubility of the complex or adjust the reduction potential of the battery. Additionally, according to some embodiments of the present disclosure, the cation can be selected from many suitable cations to control the solubility of the complex.

Additionally, according to some embodiments of the present disclosure, batteries including the complex can achieve performance targets having negligible fade. As an example, negligible fade may be achieved at less than about 5% capacity-fade after about 100 or more cycles at 150 mA·cm$^{-2}$ or greater. Additionally, according to some embodiments the complexes described herein demonstrate a new class of high-stability NRFB active materials. According to some embodiments, the complexes are stable in presence of air and water. Additionally, according to some embodiments, the complexes have a very strong and stable metal-ligand interaction with vanadium(iv); which substantially prevents decomposition of the complex. Additionally, according to some embodiments methods of the present invention can produce high-purity vanadium which is otherwise very expensive and difficult to obtain. In some embodiments, the present invention may employ impure vanadium. In some embodiments, the methods of the present invention produce high-purity vanadium from impure vanadium.

BRIEF DESCRIPTION OF THE FIGURES

The drawings illustrate generally, by way of example, but not by way of limitation, various embodiments discussed in the present document.

DETAILED DESCRIPTION

Figure 1:
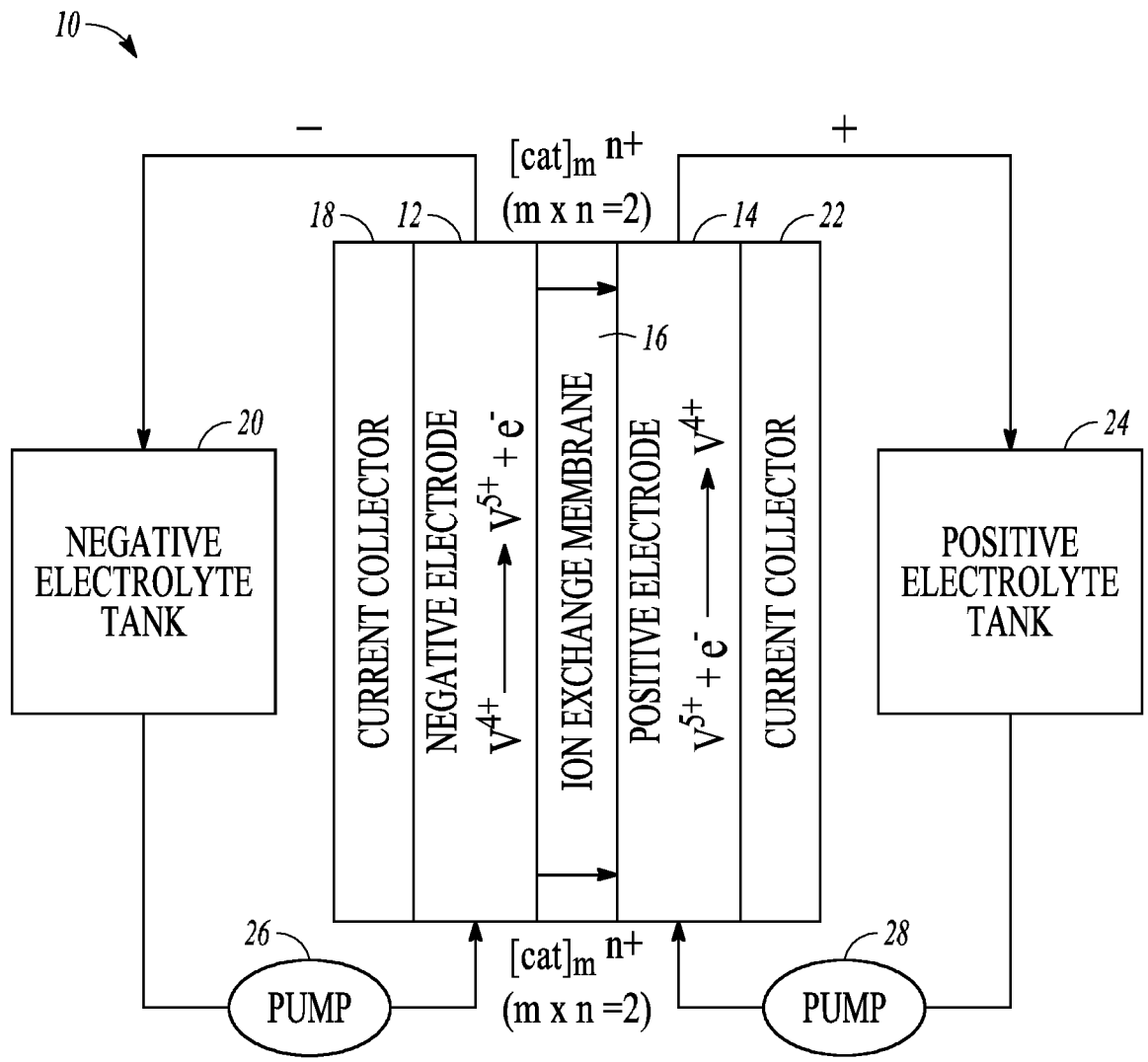
FIG. 1 is a schematic depiction of a redox flow battery, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O) CH$_2$C(O)R, C(S)R, C(O)OR, OC(O)R, C(O)N(R)$_2$, OC(O) N(R)$_2$, C(S)N(R)$_2$, (CH$_2$)$_{0-2}$N(R)C(O)R, (CH$_2$)$_{0-2}$N(R) N(R)$_2$, N(R)N(R)C(O)R, N(R)N(R)C(O)OR, N(R)N(R) CON(R)$_2$, N(R)SO$_2$R, N(R)SO$_2$N(R)$_2$, N(R)C(O)OR, N(R)

C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, ($C_1$-$C_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "hydrocarbon" or "hydrocarbyl" as used herein refers to a molecule or functional group that includes carbon and hydrogen atoms. The term can also refer to a molecule or functional group that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as ($C_a$-$C_b$)hydrocarbyl, wherein a and b are integers and mean having any of a to b number of carbon atoms. For example, ($C_1$-$C_4$)hydrocarbyl means the hydrocarbyl group can be methyl ($C_1$), ethyl ($C_2$), propyl ($C_3$), or butyl ($C_4$), and ($C_0$-$C_b$)hydrocarbyl means in certain embodiments there is no hydrocarbyl group.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing three or more ring members, of which one or more is a heteroatom such as, but not limited to, N, O, and S.

The term "heteroaryl" as used herein refers to aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

Disclosed herein are high-stability batteries. As a non-limiting example of a battery a nonaqueous redox flow battery (NRFB) having electrolyte complexes with high cell-voltage, high current density and low capacity-fade is described. In many NRFB systems the effectiveness of the system is limited by decomposition of the electrolyte complexes. In some examples, these electrolyte complexes can exhibit nearly quantitative capacity-fade after minimal cycling of the battery. The electrolyte complexes described herein can exhibit very strong metal-binding that substantially mitigates decomposition pathways. For example, the complexes, according various embodiments, can achieve can achieve performance targets of less than about 5% capacity-fade after about 100 or more cycles at 150 mA·cm$^{-2}$ or greater. Values such as this makes these complexes potentially suitable, for example, for applications in residential/distributed or grid-scale electrical energy storage.

According to the disclosure, a suitable electrolyte complex can have a structure according to Formula I or IA:

$$[ML_x]_m^{-2}[CAT]_n^{+2} \qquad (I).$$

$$[ML_2]^{-2}[CAT]^{+2} \qquad (IA).$$

In Formula I, M is metal and L is a ligand. The metal can be any suitable metal. For example, the metal can be a transition metal. Examples of suitable transition metals include vanadium (V), chromium (Cr), manganese (Mn), iron (Fe), cobalt (Co), nickel (Ni), copper (Cu), or zinc (Zn). The metal can have any suitable oxidation state. For example, if the metal is V, then the metal can be at least one of V(iv), V(v) or V(iii).

The cation can be any suitable cation with the appropriate stoichiometry to balance the charge on [ML$_2$]$^{-x}$. As shown in Formula I, the value x is the same and m and n are each independently chosen such that overall charge of the complex is 0. In some examples the cation can be a monocation, dication, or trication. The selection of a cation can be driven in part by the ability of the cation to increase the solubility of the complex. Examples of suitable cations include Ca$^{+2}$, 2Li$^+$, 2NMe$^+$, (NMe$_4^+$/H$_5$O$_2^+$), 2Na$^+$, 2K$^+$, Be$^{+2}$, and Mg$^{+2}$. The cation can be redox active as well. In Formula I, CAT is a cation. The values m and n are independently 1 to 10. The value x can be 1 to 3

The ligand L has a structure according to Formula II:

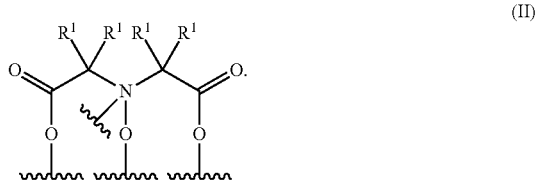

In Formula II, each of the respective wavy bonds represents a coordinate covalent bond between the metal and each oxygen as well as the nitrogen. At each occurrence in Formula II, R$^1$ is independently chosen from —H, substituted or unsubstituted (C$_1$-C$_{10}$)hydrocarbyl, —F, —Cl, —Br, and —I. In some examples, at each occurrence R$^1$ is —H. In some examples at each occurrence R$^1$ is (C$_1$-C$_{10}$) alkyl. In some examples at each occurrence R$^1$ is —F. In some examples, at least one of occurrence of R$^1$ is not —CH$_3$.

The complex is an 8 coordinate complex. An example of the complex is shown in the structure according to Formula III:

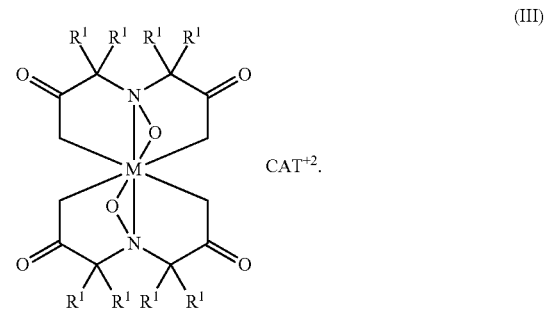

As shown in Formula III, the complex includes two ε-2-hydroxyimino-binding motifs. In such a motif, a nitrogen atom and an adjacent oxygen atom both attach to a metal atom through a coordinate covalent bond. Without intending to be bound to any theory, the inventors believe that the presence of this motif increases the stability of the complex.

Other examples of the complex include the structure according to Formula (IV):

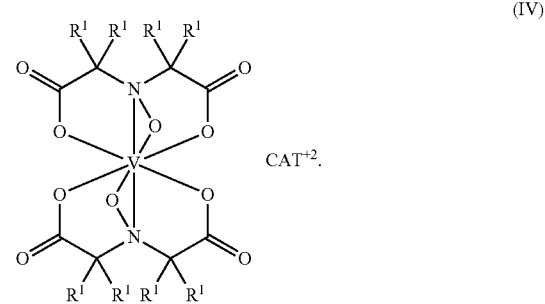

Still other examples of the complex include the structure according to Formula (V):

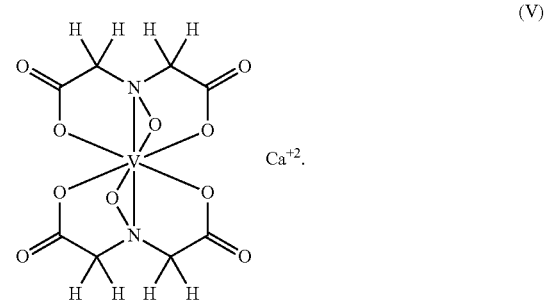

Another example of the complex includes the structure according to Formula (VI):

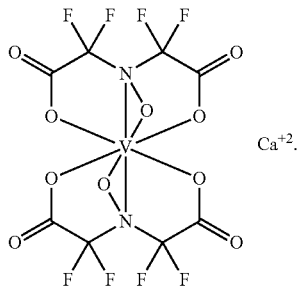
(VI)

According to various embodiments a method of making the complex includes mixing the metal and a structure according to Formula (VII):

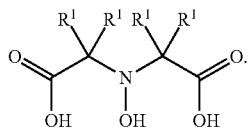
(VII)

In the mixture the ratio of metal to the structure of Formula VII is about 2:1. The structure according to Formula VII can be made by mixing $NH_3OH\,Cl$ with a structure according to Formula (VIII):

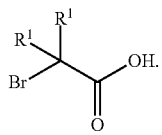
(VIII)

As shown with respect to the complex of Formulas (V) and (VI) the cation can be calcium. However, in certain applications it may be desirable to substitute calcium for a different cation such as the other cations described herein. To substitute calcium, the complex according to either of Formula V or VI can be mixed with a solvent and a salt including a fluoride and the desired cation. In solution the calcium precipitates out of solution as $CaF_2$. This leaves the desired cation in the place of the calcium of the complex of Formulas (V) and (VI). The complex can be separated from the precipitate through filtration.

Any of the complexes described herein can be included in a battery such as a redox flow battery. FIG. 1 is a schematic representation of a redox flow battery 10 including the complex. As shown in FIG. 1, the battery includes an anode solution 12. A first quantity of the complex is disposed therein. The metal in the complex of the anode solution is in a first oxidation state. The battery also includes a cathode solution 14. The cathode solution 14 includes a second quantity of the complex. The metal in the complex of the cathode is in a second oxidation state that is different than the first oxidation state. An ion-exchange membrane 16 is disposed between the anode solution and the cathode solution. Although the complex is described as a component of the anode solution is within the scope of this disclosure for the complex to be a component of the cathode solution as well. In further embodiments, the complex may be a component of both the anode solution and the cathode solution.

In either of the anode solution or the cathode solution, the first quantity of the complex and the second quantity of the complex can be optionally dispersed within a solvent. The solvent can be an aqueous or nonaqueous solvent. In examples where the solvent is a nonaqueous solvent, the solvent can be chosen from any suitable nonaqueous solvent. Examples of suitable nonaqueous solvents include N,N-dimethylacetamide, ethylene carbonate, N-methyl-2-pyrrolidone, nitromethane, γ-valerolacetone, methoxyacetonitrile, γ-butyrolactone, acetonitrile, trimethyl phosphate, propylene carbonate, 1,2-butylene carbonate, 3-methoxypropionitrile, N,N-dimethylformamide, diglyme, 1,2-dimethoxyethane, 4-methyl-2-pentanone ethyl acetate, 2-propanol nitroethane, toluene, hexane, acetone, dichloromethane, methanol, tetrahydrofuran, ethanol, and 1-propanol and mixtures thereof.

The concentration of the complex in the anode solution is substantially equivalent to a concentration of the complex in the cathode solution. In some examples the concentration of the complex in the anode solution and the concentration of the complex in the cathode solution ranges from about 5 mM to about 20 mM, about 10 mM to about 15 mM, less than, equal to, or greater than about 5 mM, 6, 7, 8, 9, 10, 11, 12, 13, 14, 15, 16, 17, 18, 19, or 20 mM.

In the battery, the anode solution is disposed within an anode tank 18. An anode reserve tank 20 is in flow communication with the anode tank 18. In order to maintain the proper amount of the complex in the anode tank excess complex can be pumped from the anode tank to the anode reserve tank. Conversely, if the amount of the complex in the anode tank is not sufficient, additional amounts of the complex can be pumped from the anode reserve tank to the anode tank.

In the battery the cathode solution is disposed within a cathode tank 22. A cathode reserve tank 24 is in flow communication with the cathode tank 22. In order to maintain the proper amount of the complex in the cathode tank excess complex can be pumped from the cathode tank to the cathode reserve tank. Conversely, if the amount of the complex in the cathode tank is not sufficient, additional amounts of the complex can be pumped from the cathode reserve tank to the cathode tank.

To facilitate the flow of the complex in the anode or cathode solutions pumps 26 and 28 are respectively configured to create a flow of the anode solution between the anode tank and the anode reserve tank and to create a flow of the cathode solution between the cathode tank and the cathode reserve tank.

The battery can have a reversible cyclic voltammetry with a formal potential ranging from about −5 V to about 6 V versus a standard hydrogen electrode, about 0.5 V to about 4 V, less than about, equal to about, or greater than about −5V, −4.5, −4, −3.5, −3, −2.5, −2, −1.5, −1, 1, 1.5, 2, 2.5, 3, 3.5, 4, 4.5, 5, 5.5, or 6 V. According to various embodiments, the cyclic voltammetry of the battery remains substantially the same over a period ranging from about 2 cycles to about 1000 cycles, about 50 cycles to about 200 cycles, less than, equal to, or greater than 2 cycles, 50, 100, 150, 200, 250, 300, 350, 400, 450, 500, 550, 600, 650, 700, 750, 800, 850, 900, 950, or 1000 cycles.

The complex remains substantially stable throughout the cycles of the battery. This increases the lifespan of the battery as compared to a battery using a corresponding complex that is free of the ligand over a corresponding plurality of cycles.

The battery can receive electrical input from many suitable sources. Non-limiting examples of suitable sources include a photovoltaic array, a wind turbine or through a connection to an electrical grid. The batteries can also be used to store electricity.

In examples in which the metal is vanadium, the vanadium can be obtained in many suitable forms. However, high-purity vanadium can be very expensive and difficult to obtain. This can be because vanadium is present, in most cases, as a trace element that can be mined in conjunction with other minerals.

As described herein, the ligand L and vanadium have a strong binding affinity. Therefore, the ligand can be used to selectively interact with and isolate vanadium from a mixture of materials. From the impure source, about 50 wt % to about 100 wt % of the vanadium can be isolated, or about 90 wt % to about 100 wt %, or less than, equal to, or greater than about 50 wt %, 55, 60, 65, 70, 75, 80, 85, 90, 95, or 100 wt %. As an example, an impure source of vanadium such as petroleum or a coal effluent can be passed over a quantity of the ligand.

The ligand can be free in solution or bound to a substrate. For example, the ligand can be functionalized with a column or other suitable solid support. In examples in which the ligand is functionalized with a column, the ligand can be functionalized to a wall of the column. While not so limited, other examples of solid supports can include or to silica gel particles disposed within the column or polyethylene beads, graphite structures, carbon polymers, alumina particles.

As the impure source of vanadium passes through the column the free vanadium and ligand bind. A concentration of the vanadium in the source can be very low. For example, the concentration of the vanadium can be as low as 1 parts per billion (ppb). In some examples vanadium in the impure source can range from 1 parts per million (PPM) to 1 PPB. Although it is possible for other metals in the source to interact with the ligand the affinity between the vanadium and ligand is so high that on balance more vanadium will be bound to the ligand than other metals. For example, of a total amount of ligand bound to a metal about 50 wt % to about 100 wt % of the ligand can be bound to the vanadium, or about 80 wt % to about 100 wt %, or about 90 wt % to about 100 wt %, or less than, equal to, or greater than about 50 wt %, 55, 60, 65, 70, 75, 80, 85, 90, 95, or 100 wt %.

The ligand and vanadium complex can be released from the column or other solid support through any suitable process. For example, the complex can be released through hydrolysis or pyrolysis. By capturing vanadium from an impure source, it is therefore possible to obtain a suitable supply of vanadium at a lower cost than obtaining ultrapure vanadium. In examples where the vanadium is bound to the ligand, and the ligand is in turn separated from the column or another solid support, the vanadium ligand complex can be used directly in the flow-cell battery. In some examples instead of being used to obtain vanadium or another metal, this method can be used to remove potentially toxic metals from a solution. Alternatively, the vanadium ligand complex, which may or may not be separated from the solid support can be used directly as a highly enriched vanadium source.

EXAMPLES

Various embodiments of the present disclosure can be better understood by reference to the following Examples which are offered by way of illustration. The present disclosure is not limited to the Examples given herein.

Example 1.1 Materials and Equipment

Dowex 50WX4, zinc acetate dihydrate and tetramethylammonium hydroxide were purchased from Acros organics. Bromoacetic acid, hydroxylamine hydrochloride, calcium chloride and hydrochloric acid were purchased from Alfa Aesar. Vanadyl bis-acetylacetonate and ferrocene were purchased from Strem chemicals and 2-propanol and dimethylsulfoxide were purchased from Fisher Scientific. All reagents and solvents were used without purification except DMSO, which was distilled over 4 A molecular sieves and degassed, and ferrocene, which was sublimated prior to use in electrochemical experiments. Tetrabutylammonium hexafluorophosphate was purchased from Alfa Aesar, recrystallized 3× from ethanol and water, and dried at 55° C. under vacuum prior to use in electrochemical experiments. Tetraethylammonium hexafluorophosphate was purchased from Alfa Aesar, recrystallized 3×, from water and dried at 55° C. under vacuum before use.

Infrared Spectroscopy was performed with a ThermoFisher is5 using an ATR attachment. UV-vis spectra were measured using a ThermoFisher Evolution 220 spectrometer. Static cell electrochemical experiments and cyclic voltammetry was carried using a Princeton Applied Research Versastat 3 potentiostat. X-ray crystallography was carried out with a Bruker D8 Venture X-ray instrument. NMR spectroscopy was carried out using a 400 MHz Bruker Advance III spectrometer.

Example 2 Synthetic Methods

Example 2.1 N-hydroxyiminodiacetic acid ($H_3HIDA$)

Zinc(ii)N-hydroxyiminodiacetate was synthesized using literature procedures and verified as matching published infrared spectra. Subsequently, N'-hydroxyiminodiacetic acid was synthesized using a modification of published methods. The zinc salt (16.0 g, 75.4 mmol) was added to 125 mL water and 12M HCl was added slowly until it dissolved (~50 mL). It was then loaded on an ion-exchange resin (Dowex 50WX4) and eluted with de-ionized water. Eluent was dried under reduced pressure to obtain a white, microcrystalline product matching literature values for infrared3 and NMR spectroscopy (1H, D20). 45% Yield (36.5 g, 172 mmol).

Example 2.2 Calcium(ii) vanadium(iv)bis-hydroxyiminodiacetate pentahydrate (CVBH)

CVBH was prepared by dissolving $H_3HIDA$ (1.97 g, 13.2 mmol) in 50 mL of DI water followed by addition of vanadylbis-acetylacetonate (1.75 g, 6.60 mmol) and stirring for one hour. Calcium chloride (0.734 g, 6.60 mmol) was then dissolved in 25 mL of DI water and added, followed by another hour of stirring. Approximately 300 mL of 2-propanol was added to the reaction mixture, which was left at 9° C. overnight to crystallize. A blue powder was collected by filtration. The identity of the product was confirmed using X-ray crystallography, which matched that previously reported. IR (ATR)/cm−1: 3322 (NH), 2988 (CH), 1588 (CO); UV-vis (DMSO): 575 nm (27.6 M−lcm−1), 800 nm (24.1 M−1 cm−1).

The vanadium bis-hydroxyiminodiacetate dianion was prepared with two tetramethylammonium counter-cations by replacing 1.0 equivalents of $CaCl_2$ in the above procedure with 2.0 equivalents of tetramethylammonium hydroxide. A blue powder was collected by filtration to yield 0.3103 g (0.556 mmol, 21% yield). Crystals were obtained through slow diffusion of methanol into an aqueous solution. IR (ATR)/cm$^{-1}$: 3402 (NH), 3031, 2962 (CH), 1617 (CO), 1488 (CN).

Example 3 Electrochemistry

Example 3.1 Static Cell Electrochemistry

Cyclic voltammetry was carried out in DMSO using a 3 mm glassy carbon electrode as working electrode, a Pt wire counter electrode, a silver wire pseudo reference electrode and tetrabutylammonium hexafluorophosphate as supporting electrode. Ferrocene was used as an internal potential reference. Static cell cycling was carried out using graphite felt (Alfa Aesar, part #AA14630RR) which was heat-treated in a furnace at 250° C. under air, overnight, before use.

Example 3.2 Flow Cell Electrochemistry

For the symmetric flow cell experiment, a flow cell with 3 layers of 250 μm carbon paper electrodes (AvCarb EP40A—they were received as thermally activated using a proprietary cycle) and 2 layers of Teflon gaskets were used in each half-side. Electrodes with an active area of 10 cm$^2$ were compressed by ~33.3% in the assembled flow cell. Nafion 212 was selected as the membrane material. 25 mL of electrolyte (0.01 M of CVBH solution in DMSO) is used in each half-cell. This solution was prepared by oxidizing a 25 mL, 0.01M solution of CVBH from vanadium(iv) to vanadium(v) at 1.0 mA and mixing with a second 25 mL, 0.01 M solution of CVBH in the vanadium(iv) oxidation state (as synthesized). A peristaltic pump (Masterflex L/S Series) with silicon tubing (Masterflex, 1.6 mm inner diameter) drove the electrolyte through the flow cell at 80 mL min$^{-1}$.

Example 3.3 Cyclic Voltammetry

As-prepared calcium (ii) vanadium(iv)bis-hydroxyiminodiacetate CVBH exhibits a reversible wave in cyclic voltammetry (CV) with a formal potential ($E^{o'}=E1/2$) of 0.30 V vs standard hydrogen electrode (SHE), determined using ferrocene as internal standard ($E^{o'}=0.64$ V vs SHE in DMSO). This is comparable to a previously reported value of 0.38 V vs. SHE for CVBH. The sample in that study was reported to be "contaminated by the mono-sodium salt of the ligand," explaining the observed −80 mV deviation and suggesting the accuracy of the current measurement over the former.

CV data with variable scan rates were used to determine the diffusion coefficient for the one-electron oxidation of CVBH$^{-2}$ by fitting with the Randles-Sevcik equation. In addition, to investigate the effect of solvent on this property, the analysis was carried out in propylene carbonate (PC). The diffusion coefficients were found to be similar in the two solvents (8.3×10$^{-7}$ and 5.6×10$^{-7}$ cm$^2$·s$^{-1}$ in DMSO and PC, respectively, with 0.5 M TBAPF$_6$ as supporting electrolyte) and close to those reported for other NRFB electrolyte candidates as well as vanadium redox flow battery (VRFB) systems. This suggests that the electrode kinetics of CVBH are suitable for its implementation in NRFB systems.

Figure 2:
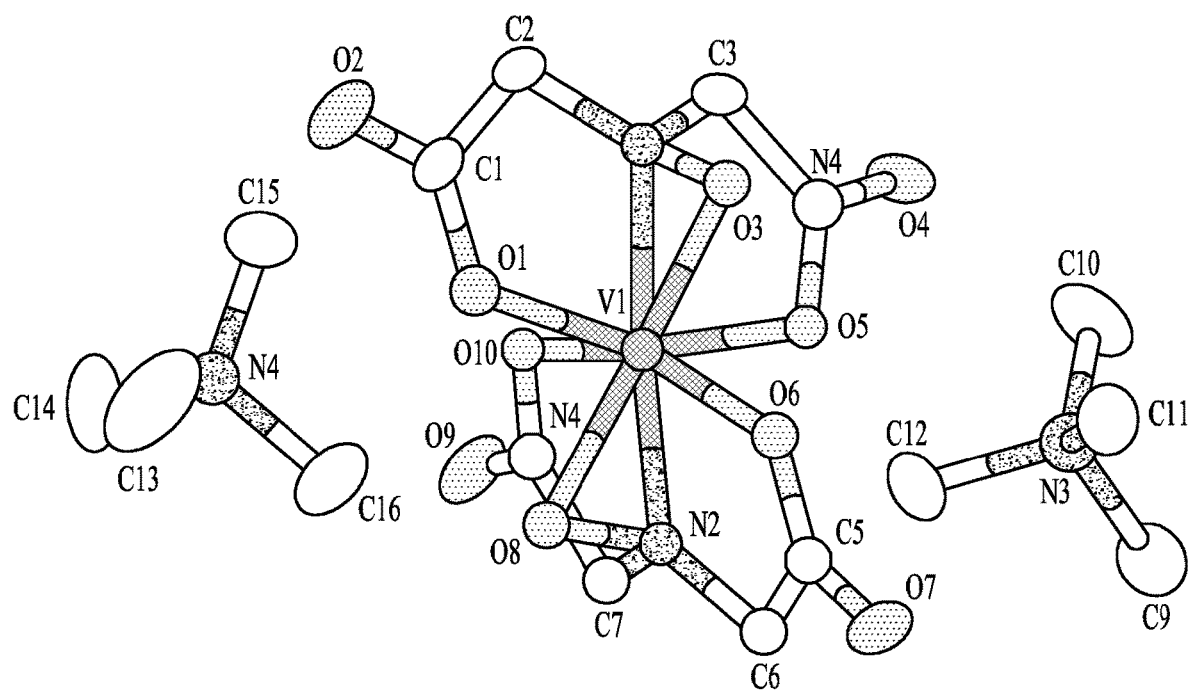
FIG. 2 is a model of a crystal structure of a complex with an arrow pointing to a ε-2 hydroxyimino-group, in accordance with various embodiments.

Since the solubility of CVBH is low in solvents other than DMSO and water, investigation of the electrochemistry in PC necessitated the synthesis of the bis-tetramethylammonium (TMA) salt of vanadium bis-hydroxyiminodiacetate (VBH), which was characterized using FTIR and X-ray crystallography (FIG. 2). While the coordination sphere of the VBH dianion is unperturbed compared to that of CVBH, solubility is greatly altered with two diffuse TMA counter-cations compared to the Ca$^{+2}$ counter-cation of CVBH. Altering the cation(s) of VBH$^{2-}$ is a way to tune solubility in various battery-relevant solvents and compatibility with an array of membrane/separator architectures and supporting electrolytes. These attributes are paramount to realization of high power and energy densities in NRFB systems and this strategy offers a promising avenue for optimization.

Figure 3:
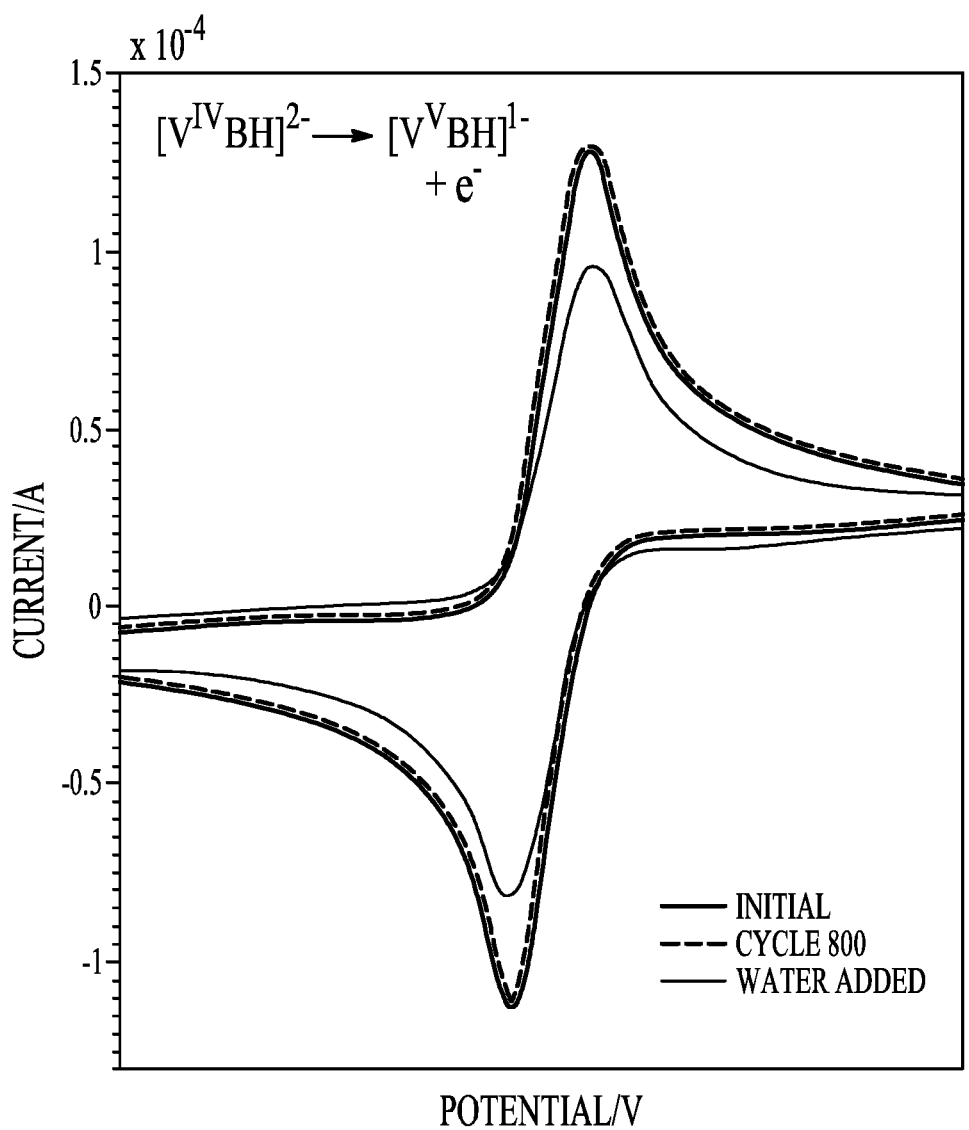
FIG. 3 is a cyclic voltammetry plot, in accordance with various embodiments.
Figure 4:
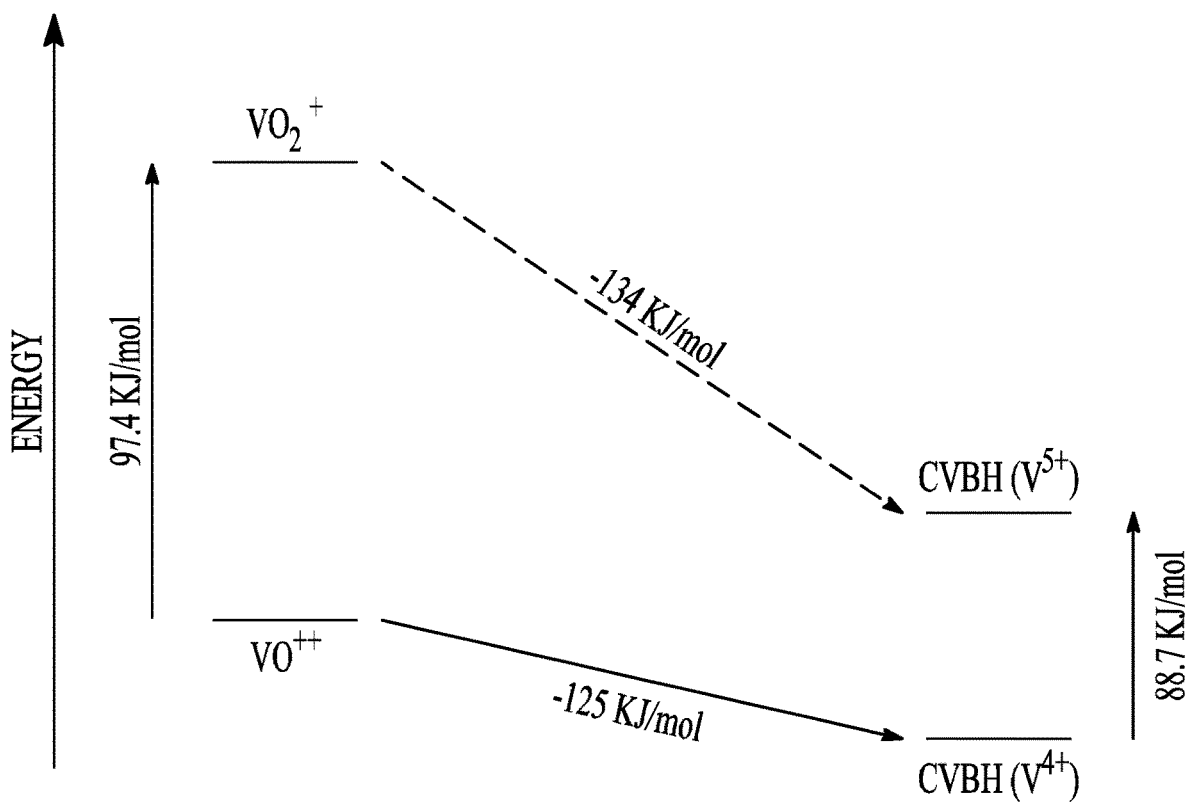
FIG. 4 is a plot showing the thermodynamic cycle of the reduction potential of vanadium ions, in accordance with various embodiments.

Exhaustive cycling of CVBH using CV, shown in FIG. 3, evidenced virtually no change in the shape of the voltammogram over 800 cycles. Any decomposition of CVBH under these conditions would be evident as a decrease in peak current and changes in reversibility, as the identity of the species present at the electrode evolved over time. Furthermore, the addition of 20% water (by volume) in the presence of oxygen effected no change in voltammogram shape and the observed decrease in peak current was commensurate with that expected from the decrease in concentration. This is in stark contrast to the anaerobic and anhydrous conditions that are necessary in handling other NRFB active materials. One such compound, V(acac)$_3$, rapidly decomposes in the presence of water when oxidized to the 4$^+$ state, representing a challenge to its implementation. This occurs even in ostensibly anhydrous systems due to the presence of adventitious water, and is the result of ligand substitution, yielding a vanadyl (V=O) species that is nearly ubiquitous in aqueous vanadium(iv) coordination chemistry. It should be further noted that CVBH is stable in both the reduced, vanadium(iv), state (as-synthesized) and the oxidized, vanadium(v) state, with metal ligand stability constants of 8.2×10$^{21}$ and 2.6×10$^{23}$, respectively. While the former has been measured, the latter can be deduced using a thermodynamic cycle, constructed from published data for the vanadium(iv/v) reduction potentials of CVBH and aqueous, acidic vanadium ions, along with the metal-ligand stability constant of CVBH in the vanadium(iv) oxidation state (FIG. 4).

Example 3.4 Static Cell Cycling

Figure 5A:
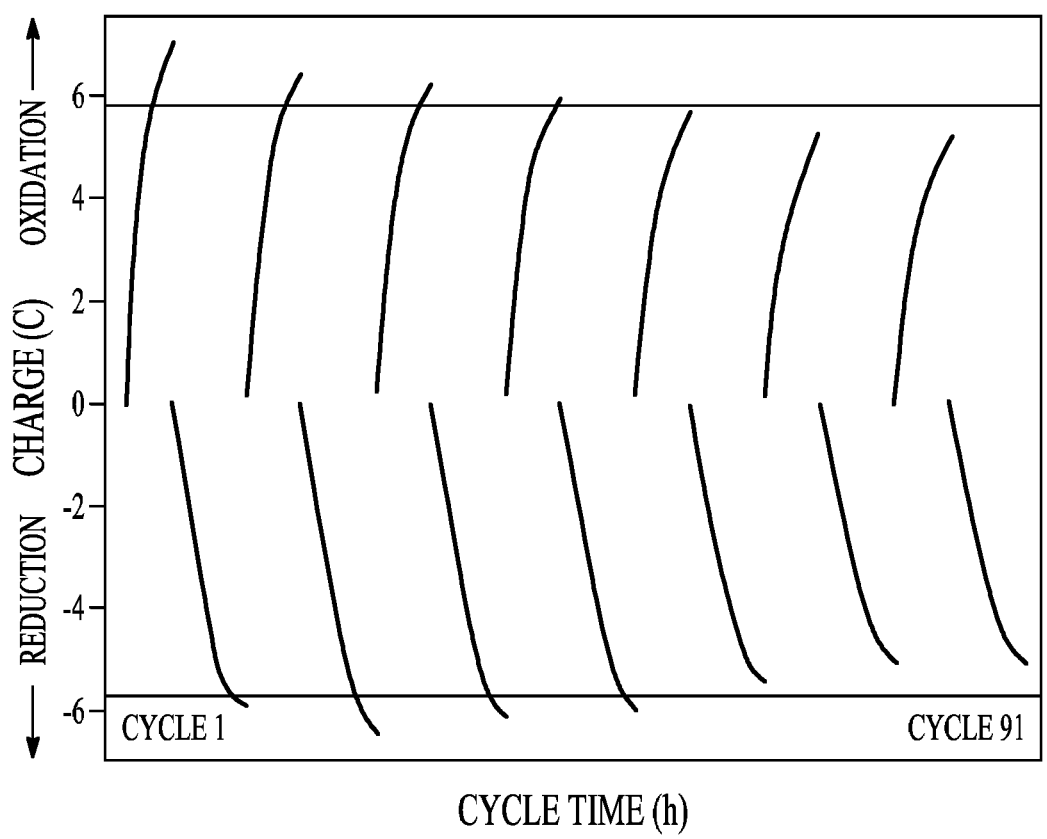
FIGS. 5A-5B are plots showing deep redox cycling of a battery including the complex, in accordance with various embodiments.
Figure 5B:
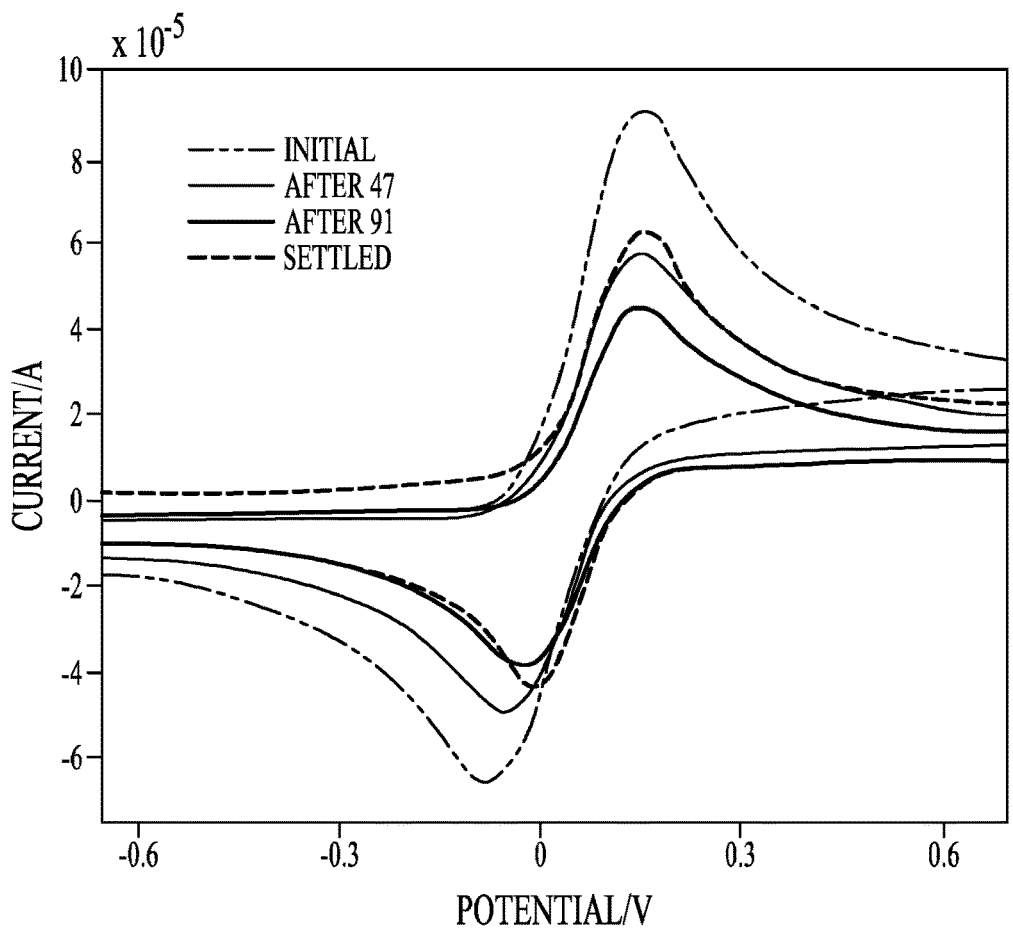
Figure 5C:
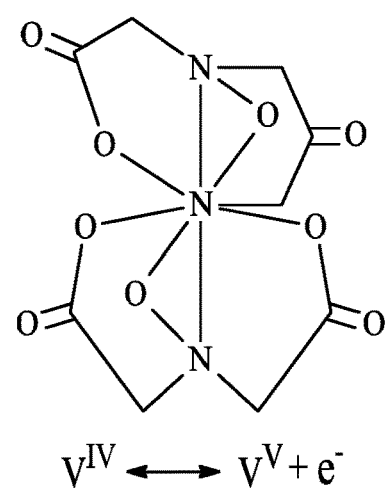
FIG. 5C shows the structure of the complex, in accordance with various embodiments.
Figure 6:
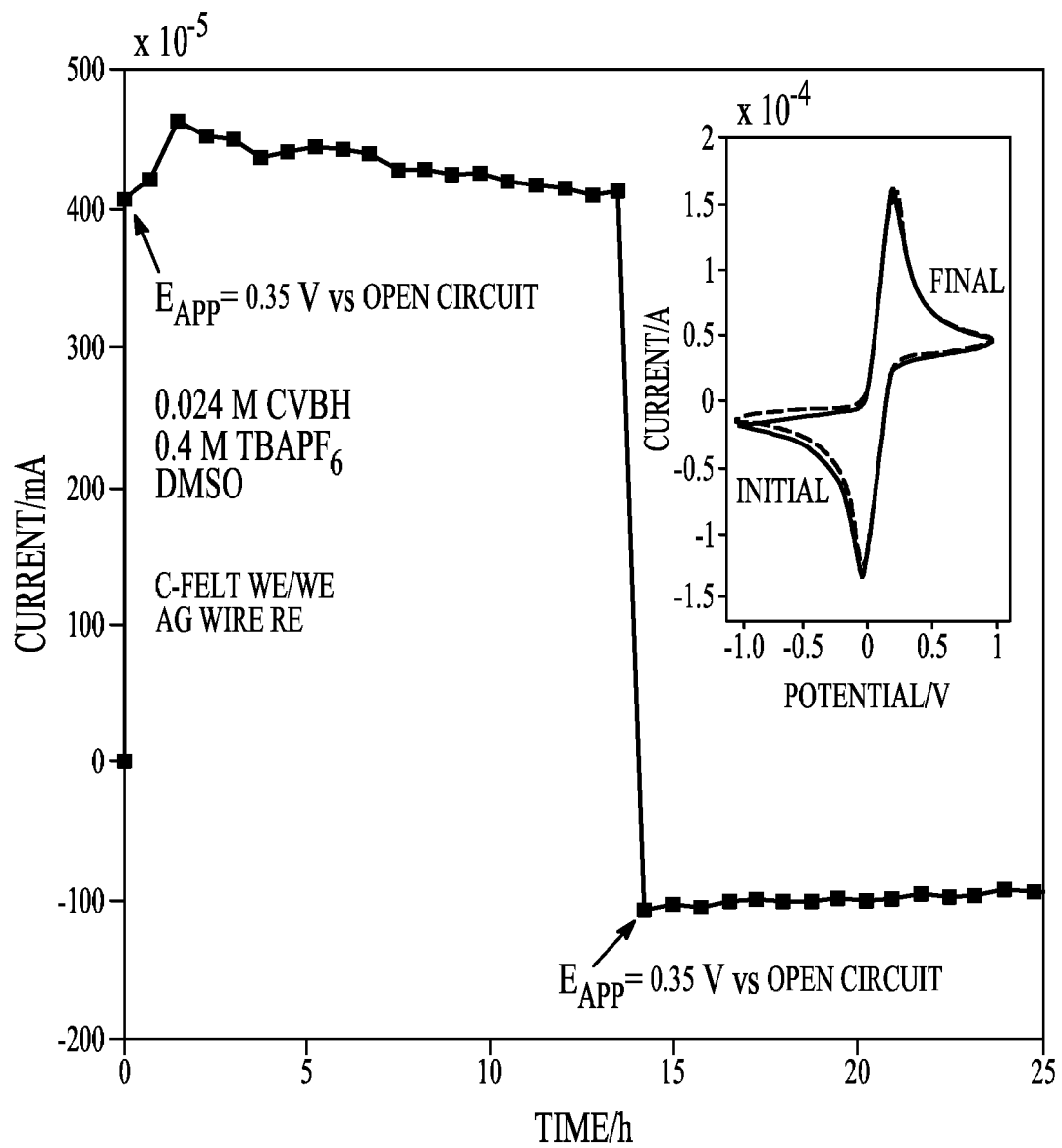
FIG. 6 shows the current observed in a battery including the complex, in accordance with various embodiments.

In an NRFB, stability under the conditions of CV does not guarantee stability during bulk electrochemical cycling. As such, the behavior of CVBH during cycling to ~80% state of charge was investigated by alternately applying potentials of 0.35 V and −0.35 V vs. open circuit to oxidize and reduce the compound, respectively. FIG. 5 shows that this process is reversible, with no observed change in the shape of the CV before and after cycling more than 90 times. Some decrease in peak current over time was observed (FIG. 5B), however, it was restored after stirring was stopped for 20 minutes (FIG. 5B, dotted line). This settling period allowed a small amount of flocculence that had accumulated during the multi-day cycling experiment to dissipate, suggesting a mechanism other than electrolyte decomposition was responsible for the loss of peak current. While this cycling was carried out at relatively low current (~5 mA during oxidation, ~2 mA during reduction), much higher current was observed in experiments in which the glass frit separating the working and counter electrodes was removed (>400 mA and 100 mA, respectively, for oxidation and reduction) (FIG. 6). Although no charge was stored in this control experiment, it suggests that, with a better-suited separator, CVBH will be amenable to cycling at high current densities without decomposition.

Example 3.4 Flow Cell Cycling

Figure 7A:
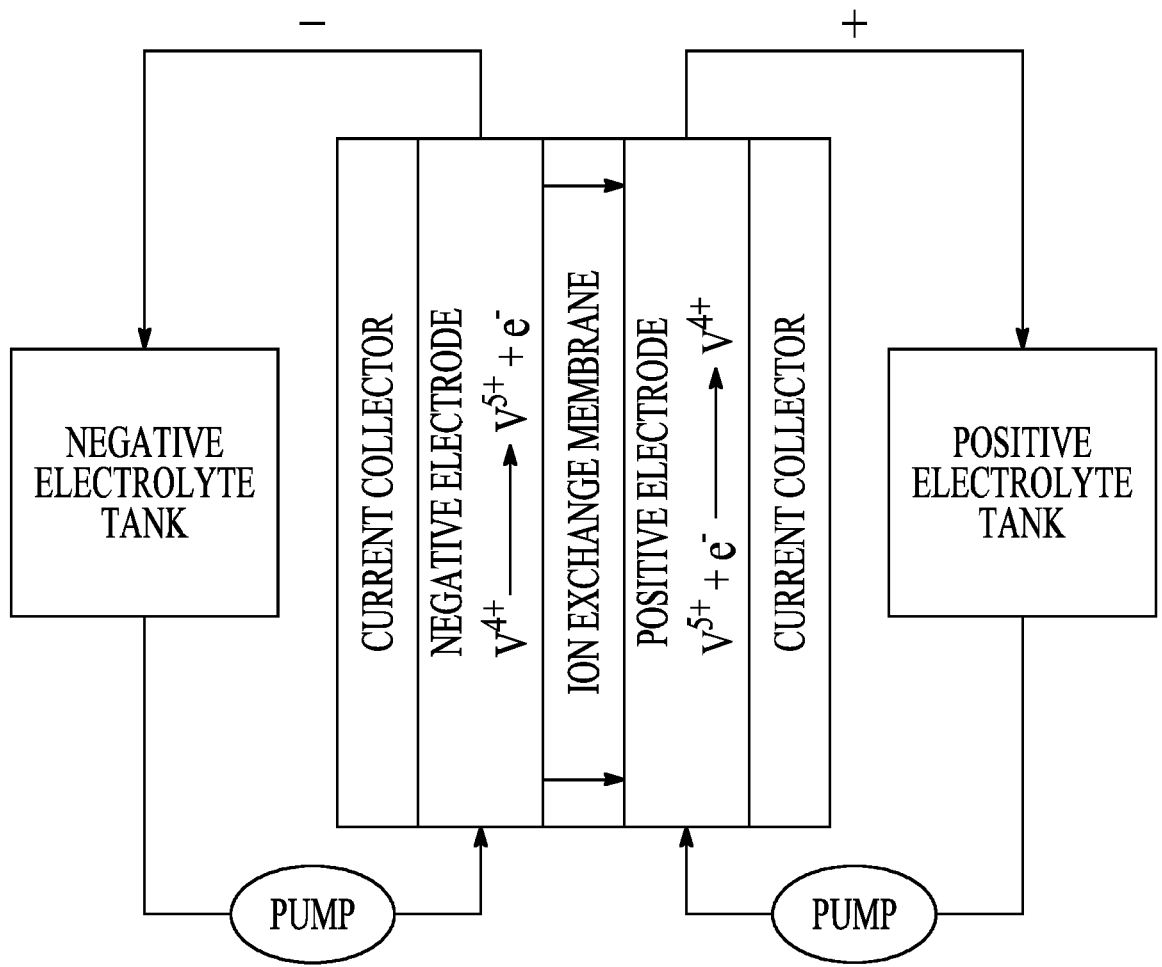
FIGS. 7A-7C are schematic diagrams and plots showing the schematic of the symmetric flow cell and charge/discharge potential profile.
Figure 8:
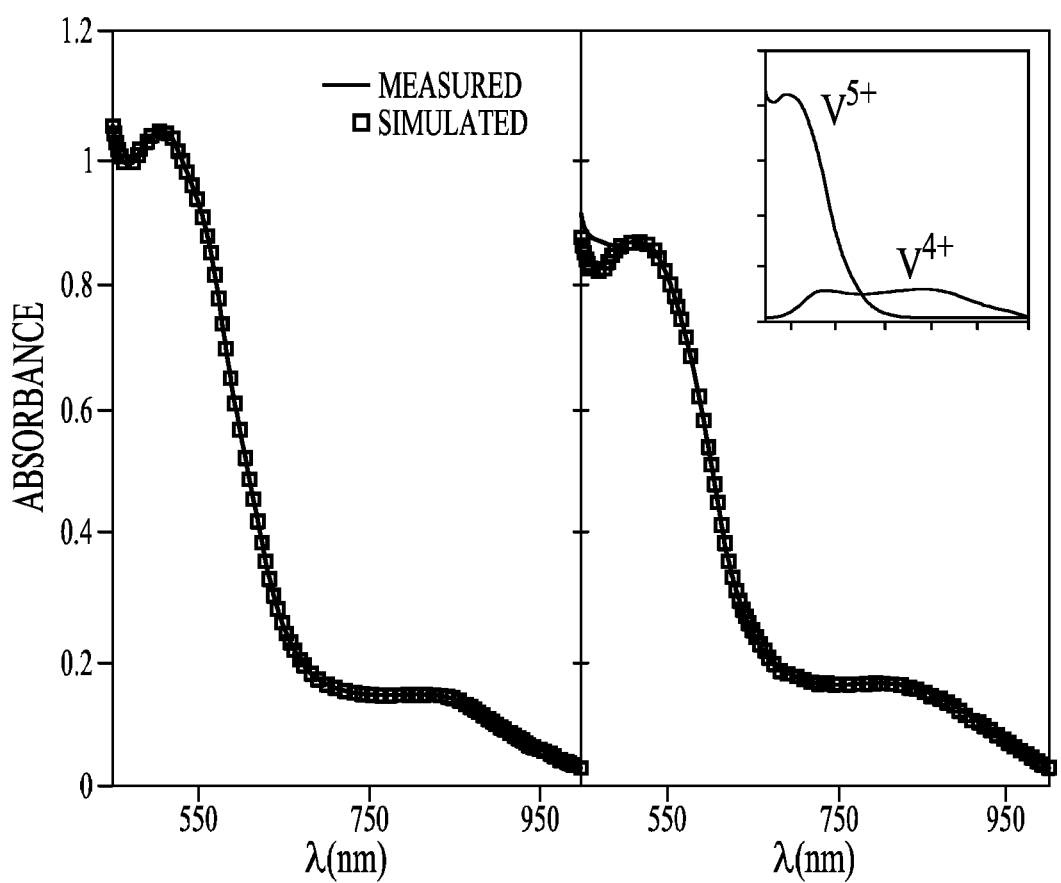
FIG. 8 shows UV-vis spectra of the complex before and after cycling, in accordance with various embodiments.

On the strength of observations of high stability during static cell cycling, CVBH was investigated in a flow-battery architecture (FIG. 7A). Symmetric redox cycling of a 1:1 mixture of vanadium (iv/v) was carried out to probe the stability of the active species in a controlled manner. The sample was prepared by oxidizing a 10 mM sample of CVBH completely to the vanadium(v) oxidation state and mixing with as-synthesized CVBH in the vanadium(iv) oxidation state. With this configuration, during discharging, vanadium(iv) is oxidized at the negative electrode and vanadium(v) is reduced at the positive electrode, eliminating potential side effects of additional compounds present in a conventional flow battery cycling experiment. This galvanostatic cycling experiment was performed at 20 mA and between cell potential cutoffs of −0.5 V and +0.5 V, corresponding to ~48% depth of charge/discharge in the beginning of the cycling. Measured UV-vis spectra were simulated using spectra of CVBH in the vanadium(iv) and vanadium(v) oxidation states as synthetic components to determine state of charge, as shown in FIG. 8. The electronic transitions resulting in the observed spectra have been suggested to comprise four partially overlapping d-d bands between 550 and 900 nm for the reduced complex and a single, higher extinction coefficient band for the oxidized complex at ~500 nm, arising from carboxylate→vanadium and/or ε2 hydroxyimino→vanadium charge transfer (FIG. 8, inset). The rich electronic spectroscopy of CVBH can provide a convenient means of measuring state of charge in-situ.

Figure 7B:
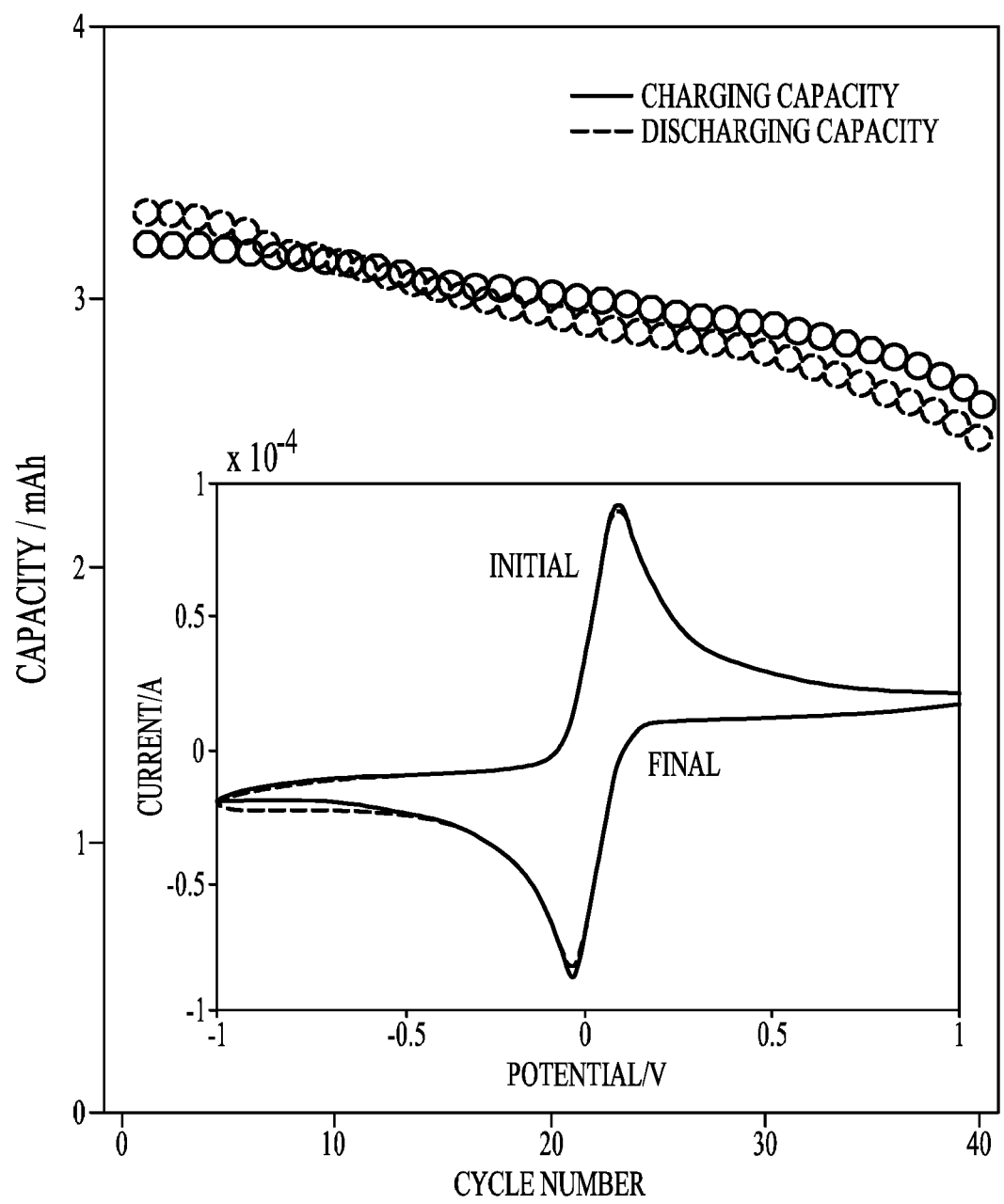
Figure 7C:
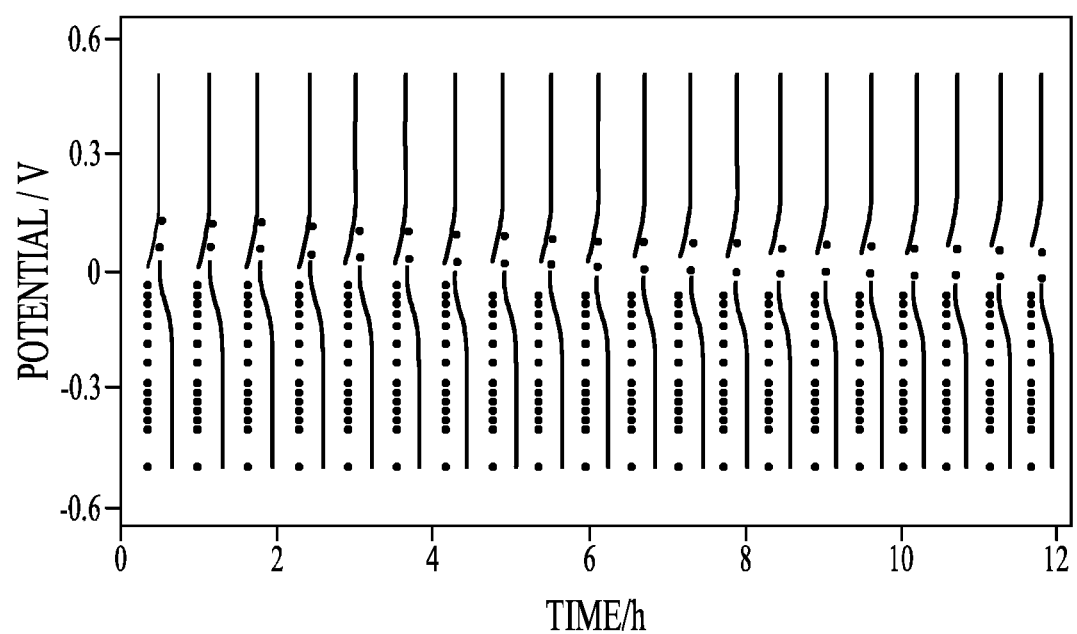

The cycling performance of a 0.01 M CVBH solution in DMSO is shown in FIGS. 7B and 7C. Over 40 cycles, ~83% of the charging capacity and ~75% of the discharging capacity were retained. CV and UV-vis spectra collected before and after the cycling experiment matched very closely, as shown in the inset of FIG. 6B and in FIG. 7, respectively. The lack of change in the voltammogram shape and the UV-vis spectrum suggests that the modest capacity fade observed in the experiment was not due to electrolyte decomposition and can be attributed to unwanted active species crossover across the membrane as a result of unoptimized flow cell and operating conditions. Similar results showing crossover and related capacity fade have been reported in several VRFB studies using Nafion 212. We conclude that, with optimization of flow cell geometry and operating conditions, the proposed electrolyte has the potential to meet the stability requirements for grid-scale energy storage applications.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

Additional Embodiments

The following exemplary embodiments are provided, the numbering of which is not to be construed as designating levels of importance:

Embodiment 1 provides a complex having a structure according to Formula I:

$$[ML_2]_m^{-2}[CAT]_n^{+2} \qquad (I),$$

wherein,

M is metal;

L is a ligand has a structure according to Formula II:

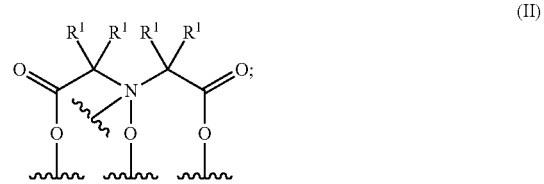

at each occurrence $R^1$ is independently chosen from —H, substituted or unsubstituted $(C_1-C_{10})$hydrocarbyl, —F, —Cl, —Br, and —I;

n and m are independently 1 to 10;

x is 1 to 3; and

CAT is a cation.

Embodiment 2 provides the complex of Embodiment 1, wherein Formula I has the structure:

$$[ML_2]^{-2}[CAT]^{+2}.$$

Embodiment 3 provides the complex according to any one of Embodiments 1-2, wherein the metal is a transition metal optionally chosen from V, Cr, Mn, Fe, Co, Ni, Cu, or Zn.

Embodiment 4 provides the complex according to any one of Embodiments 1-3, wherein the metal is at least one of V(iv) and V(v).

Embodiment 5 provides the complex according to any one of Embodiments 1-4, wherein the cation is chosen from $Ca^{+2}$, $2Li^+$, $2NMe^+$, $(NMe_4^+/H_5O_2^+)$, $2Na^+$, $2K^+$, $Be^{+2}$, and $Mg^{+2}$.

Embodiment 6 provides the complex according to any one of Embodiments 1-5, wherein at each occurrence $R^1$ is —H.

Embodiment 7 provides the complex according to any one of Embodiments 1-6, wherein at each occurrence $R^1$ is $(C_1-C_{10})$alkyl.

Embodiment 8 provides the complex according to any one of Embodiments 1-7, wherein at each occurrence $R^1$ is —F.

Embodiment 9 provides the complex according to any one of Embodiments 1-8, wherein at least one of occurrence of $R^1$ is not —$CH_3$.

Embodiment 10 provides the complex according to any one of Embodiments 1-9, wherein the complex has a coordination number of 8.

Embodiment 11 provides the complex according to any one of Embodiments 1-10, wherein each bond between the ligand and the metal is a coordinate covalent bond.

Embodiment 12 provides the complex according to any one of Embodiments 1-11, wherein the complex has the structure according to Formula (III):

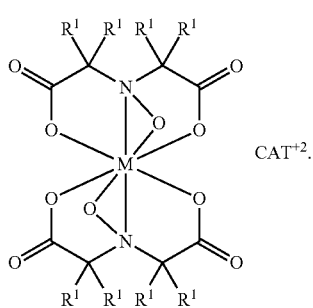

(III)

Embodiment 13 provides the complex according to any one of Embodiments 1-12, wherein the complex has the structure according to Formula (IV):

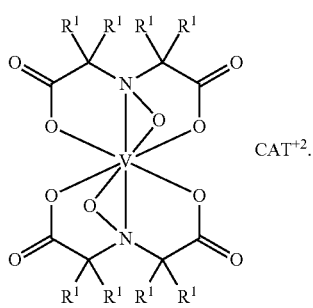

(IV)

Embodiment 14 provides the complex according to any one of Embodiments 1-13, wherein the complex has the structure according to Formula (V):

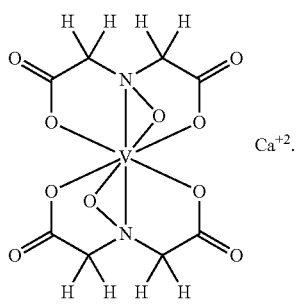

(V)

Embodiment 15 provides the complex according to any one of Embodiments 1-14, wherein the complex has the structure according to Formula (VI):

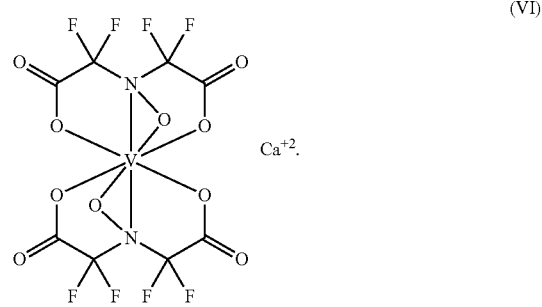

(VI)

Embodiment 16 provides a battery comprising:
an anode solution comprising a first quantity of the complex according to any one of Embodiments 1-17, having the metal in a first oxidation state; and
a cathode solution comprising a second quantity of the complex of Embodiment 1, having the metal in a second oxidation state different than the first oxidation state.

Embodiment 17 provides the battery of Embodiment 16, wherein the first quantity of the complex and the second quantity of the complex are dispersed within a solvent.

Embodiment 18 provides the battery of Embodiment 17, wherein the solvent is a nonaqueous solvent.

Embodiment 19 provides the battery of Embodiment 17, wherein the solvent is chosen from N,N-dimethylacetamide, N-methyl-2-pyrrolidone, nitromethane, γ-valerolactone, methoxyacetonitrile, γ-butyrolactone, acetonitrile, trimethyl phosphate, propylene carbonate, 1,2-butylene carbonate, 3-methoxypropionitrile, N,N-dimethylformamide, diglyme, 1,2-dimethoxyethane, 4-methyl-2-pentanone ethyl acetate, 2-propanol nitroethane, toluene, hexane, acetone, dichloromethane, methanol, tetrhydrofuran, ethanol, and 1-propanol.

Embodiment 20 provides the battery of Embodiment 17, wherein a concentration of the complex in the anode solution is substantially equivalent to a concentration of the complex in the cathode solution.

Embodiment 21 provides the battery of Embodiment 20, wherein the concentration of the complex in the anode solution and the concentration of the complex in the cathode solution ranges from about 5 mM to about 20 mM.

Embodiment 22 provides the battery according to any one of Embodiments 16-21, further comprising an ion-exchange membrane disposed between the anode solution and the cathode solution.

Embodiment 23 provides the battery according to any one of Embodiments 16-22, wherein the anode solution is disposed within an anode tank.

Embodiment 24 provides the battery according to any one of Embodiments 16-23, wherein the cathode solution is disposed within a cathode tank.

Embodiment 25 provides the battery according to any one of Embodiments 23-24, further comprising an anode reserve tank in flow communication with the anode tank.

Embodiment 26 provides the battery of Embodiment 25, wherein the anode reserve tank contains a quantity of the anode solution.

Embodiment 27 provides the battery of Embodiment 24, further comprising a cathode reserve tank in flow communication with the cathode tank.

Embodiment 28 provides the battery of Embodiment 27, wherein the cathode reserve tank contains a quantity of the cathode solution.

Embodiment 29 provides the battery of any one of Embodiments 25 or 27, further comprising a pump configured to create a flow of the anode solution between the anode tank and the anode reserve tank and to create a flow of the cathode solution between the cathode tank and the cathode reserve tank.

Embodiment 30 provides the battery according to any one of Embodiment 16-29, wherein the battery has a reversible cyclic voltammetry with a formal potential ranging from about −5 V to about 6 V.

Embodiment 31 provides the battery of Embodiment 30, wherein the cyclic voltammetry of the battery remains substantially the same over a period ranging from about 2 cycles to about 1000 cycles.

Embodiment 32 provides the battery according to any one of Embodiments 16-31, wherein the complex of Embodiment 1, remains substantially stable after a plurality of cycles of the battery.

Embodiment 33 provides the battery according to any one of Embodiments 16-32, wherein a stability of the complex of Embodiment 1 after a plurality of cycles of the battery is greater than a stability of a corresponding complex that is free of the ligand over a corresponding plurality of cycles.

Embodiment 34 provides a method of making the complex according to any one of Embodiments 1-33, comprising
mixing the metal and a structure according to Formula (VII):

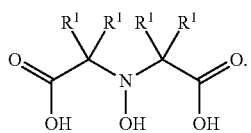

Embodiment 35 provides the method of Embodiment 34 further comprising making the structure according to Formula (V), the method comprising:
mixing $NH_2OH$ with a structure according to Formula (VIII):

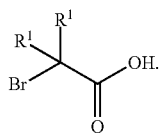

Embodiment 36 provides a complex having a structure according to Formula (V):

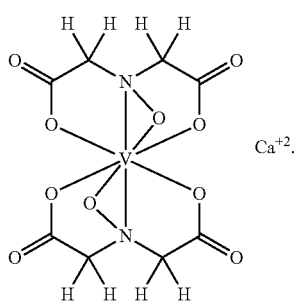

Embodiment 37 provides a method of making the complex of any one of Embodiments 1-15, comprising:
mixing a solution comprising the metal with the ligand to form the complex; and
separating the complex from the solution.

Embodiment 38 provides the method of Embodiment 37, wherein the ligand is functionalized with a solid support.

Embodiment 39 provides the method of Embodiment 38, wherein the solid support is chosen from a column wall, a silica gel particle, a polyethylene bead, a carbon polymer, a graphite structure, an alumina particle or a combination thereof.

Embodiment 40 provides the method of any one of embodiments 38 or 39, wherein separating the complex comprises at least one of hydrolyzing and pyrolyzing the ligand from the solid support.

Embodiment 41 provides the method according to any one of Embodiments 37-41, wherein the solution comprises petroleum or coal effluent.

Embodiment 42 provides the method according to any one of Embodiments 37-41, wherein a concentration of the metal within the solution is as low as about 1 PPB.

Embodiment 43 provides the method according to any one of Embodiments 37-42, further comprising disposing the complex within the battery of any one of Embodiments 16-34.

Embodiment 44 provides a battery according to any one of Embodiments 16-34 comprising the complex made according to the method of any one of Embodiments 34, 35, and 37-42.

Embodiment 45 provides a column comprising the ligand according to any one of Embodiments 1-16 affixed to a component thereof.

Embodiment 46 provides the column of Embodiment 45, wherein the component is chosen from a wall of the column, a silica gel particle disposed within the column, and a combination thereof.

What is claimed is:

1. A complex having a structure according to Formula I:

$$[ML_2]_m^{-2}[CAT]_n^{+2} \qquad (I),$$

wherein,
M is metal;
L is a ligand has a structure according to Formula II:

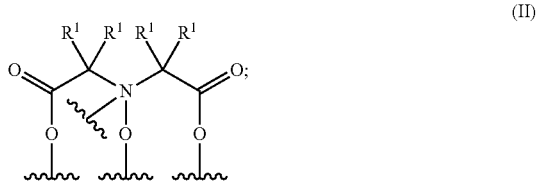

at each occurrence $R^1$ is chosen from $(C_1\text{-}C_{10})$hydrocarbyl and —F;
n and m are independently 1 to 10; and
CAT is a cation.

2. The complex of claim 1, wherein Formula I has the structure according to Formula IA:

$$[ML_2]^{-2}[CAT]^{+2} \qquad (IA).$$

3. The complex of claim 1, wherein the metal is a transition metal optionally chosen from V, Cr, Mn, Fe, Co, Ni, Cu, or Zn.

4. The complex of claim 1, wherein the metal is at least one of V(iv) and V(v).

5. The complex of claim 1, wherein the cation is chosen from $Ca^{+2}$, $2Li^+$, $2NMe^+$, $(NMe_4^+/H_5O_2^+)$, $2Na^+$, $2K^+$, $Be^{+2}$, and $Mg^{+2}$.

6. The complex of claim 1, wherein the complex has a coordination number of 8.

7. The complex of claim 1, wherein the complex has the structure according to Formula (III):

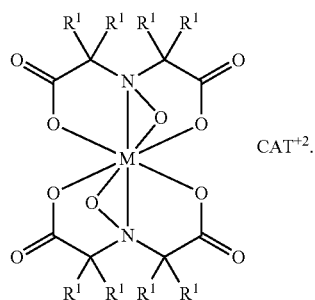

(III)

8. The complex of claim 1, wherein the complex has the structure according to Formula (IV):

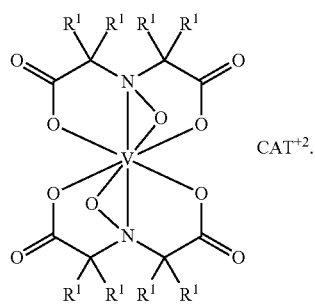

(IV)

9. The complex of claim 1, wherein the complex has the structure according to Formula (VI):

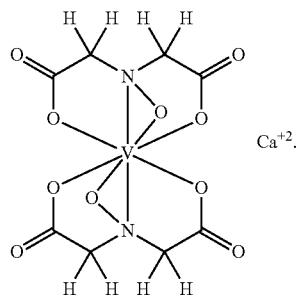

(V)

10. A battery comprising:

an anode solution comprising a first quantity of a complex having a structure according to Formula I:

$$[ML_x]_m^{-2}[CAT]_n^{+2} \quad (I),$$

wherein,

M is metal;

L is a ligand has a structure according to Formula II:

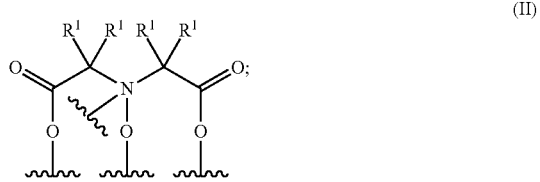

(II)

at each occurrence $R^1$ is independently chosen from —H, substituted or unsubstituted $(C_1-C_{10})$hydrocarbyl, —F, —Cl, —Br, and —I;

n and m are independently 1 to 10; and

CAT is a cation having the metal in a first oxidation state; and a cathode solution comprising a second quantity of the complex of formula I, having the metal in a second oxidation state different than the first oxidation state.

11. The battery of claim 10, wherein the first quantity of the complex and the second quantity of the complex are dispersed within a solvent.

12. The battery of claim 11 wherein a concentration of the complex in the anode solution is substantially equivalent to a concentration of the complex in the cathode solution.

13. The battery of claim 10, wherein a cyclic voltammetry of the battery remains substantially the same over a period ranging from about 2 cycles to about 1000 cycles.

14. The battery of claim 10, wherein a stability of the complex after a plurality of cycles of the battery is greater than a stability of a corresponding complex that is free of the ligand over a corresponding plurality of cycles.

15. A method of making the complex of claim 1, comprising mixing the metal and a structure according to Formula (VII):

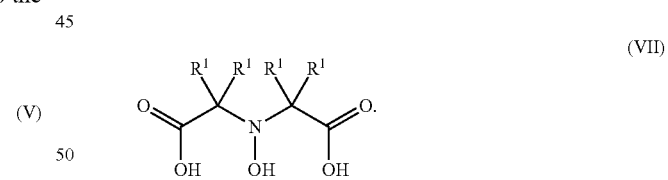

(VII)

16. The method of claim 15 further comprising making the structure according to Formula (V), the method comprising:

mixing $NH_2OH$ with a structure according to Formula (VIII):

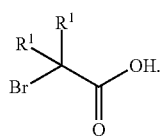

(VIII)

17. The battery of claim 10, wherein Formula I has the structure according to Formula IA:

$$[ML_2]^{-2}[CAT]^{+2} \quad (IA).$$

18. The battery of claim 10, wherein the metal is a transition metal optionally chosen from V, Cr, Mn, Fe, Co, Ni, Cu, or Zn.

19. The battery of claim 10, wherein the metal is at least one of V(iv) and V(v).

20. The battery of claim 10, wherein the cation is chosen from $Ca^{+2}$, $2Li^+$, $2NMe^+$, $(NMe_4^+/H_5O_2^+)$, $2Na^+$, $2K^+$, $Be^{+2}$, and $Mg^{+2}$.

21. The battery of claim 10, wherein at each occurrence $R^1$ is —H.

22. The battery of claim 10, wherein at each occurrence $R^1$ is $(C_1\text{-}C_{10})$alkyl.

23. The battery of claim 10, wherein at each occurrence $R^1$ is —F.

24. The battery of claim 10, wherein the complex has a coordination number of 8.

25. The battery of claim 10, wherein the complex has the structure according to Formula (III):

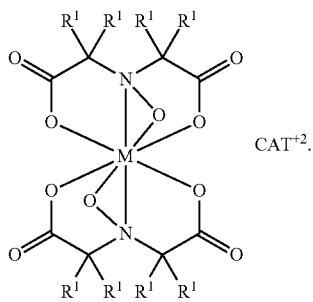

(III)

26. The battery of claim 10, wherein the complex has the structure according to Formula (IV):

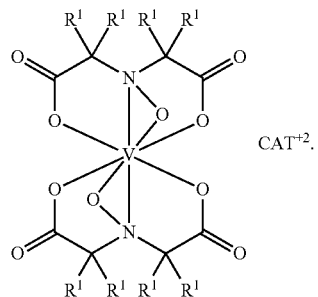

(IV)

27. The battery of claim 10, wherein the complex has the structure according to Formula (V):

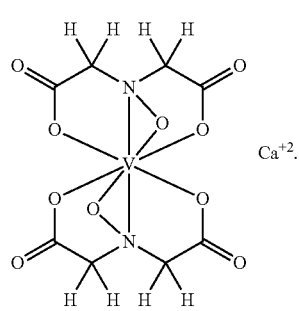

(V)

28. The battery of claim 10, wherein the complex has the structure according to Formula (VI):

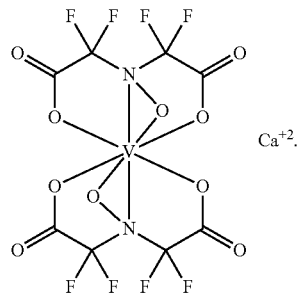

(VI)

* * * * *